United States Patent [19]

Amano et al.

[11] Patent Number: 4,572,657

[45] Date of Patent: Feb. 25, 1986

[54] COLOR PRINTER

[75] Inventors: Tadashi Amano; Yasuaki Sato; Yasuo Ohkoshi, all of Hachioji, Japan

[73] Assignee: Konisiroku Photo Industry Co., Ltd., Tokyo, Japan

[21] Appl. No.: 501,004

[22] Filed: Jun. 3, 1983

[30] Foreign Application Priority Data

Jun. 10, 1982 [JP] Japan .................................. 57-100086
Jun. 11, 1982 [JP] Japan .................................. 57-101225

[51] Int. Cl.$^4$ ............................................. G03B 27/80
[52] U.S. Cl. ..................................................... 355/38
[58] Field of Search .................................... 355/38, 32

[56] References Cited

U.S. PATENT DOCUMENTS

| 3,051,069 | 8/1962 | Neale | 355/38 |
| 3,647,296 | 3/1972 | Long | 355/38 |
| 3,873,200 | 3/1975 | Crete | 355/38 |
| 3,927,938 | 12/1975 | Seigenji | 355/38 |
| 4,464,045 | 8/1984 | Findeis et al. | 355/38 |

Primary Examiner—Monroe H. Hayes
Attorney, Agent, or Firm—James E. Nilles

[57] ABSTRACT

A color printer wherein densities of blue, green and red colors of an object copied print with respect to an original color picture for setting standard copying conditions by using the original color picture, a copied print is made by using the original color picture for setting standard copying conditions, densities of blue, green and red colors of the copied print are measured in an optical path of copying exposure, and the standard copying conditions are set on the basis of the functions of the measured densities of the object copied print and the copied print.

2 Claims, 5 Drawing Figures

COLOR PRINTER

BACKGROUND OF THE INVENTION

1. Field of the Invention

This invention relates to a color printer for making copied prints from original color pictures.

2. Description of the Prior Art

It is generally known from experience that, in a regular photographic scene, the average reflection powers of blue, green and red, which are obtained by integrating the photographic scene as a whole, are substantially constant. Accordingly, in a conventional color printer, a copied print having a high color balance and a reasonable degree of printing is made by a gray integration printing method, in which the amounts of transmitted light of blue, green and red colors of an original color picture are measured to control the exposure, which is applied to blue, green and red color-sensitive layers of a photosensitive copying medium (mainly, color paper), to a constant level on the basis of the amounts determined in the mentioned measurement.

When the above method is used, high-quality copied prints can be made from most of the various original color pictures. In order to make such high-quality copied prints, it is necessary that the standard copying conditions in a color printer for applying constant exposure to color-sensitive layers be set in a desirable manner. When the constant expoure matching the photographic distribution probability of an original color picture is applied to color-sensitive layers, a rate of obtaining a highquality copied print can be increased. For example, during the summer, in which scenes at beaches and outside houses are photographed frequently, the exposure, which is controlled to a constant level as mentioned above, is set to a lower level, and when indoor scenes are photographed, frequently with a flashlight, the standard copying conditions are set so as to maintain the exposure at a higher level. This allows the rate of making high-quality copied prints to be increased.

The film manufacturers and some photo finishers provide or make original color pictures for use in setting standard copying conditions and object copied prints are based on the original color pictures with reference to the statistic and experiential photographing distribution of original color pictures. In a color printer, an original color picture (which will be hereinafter referred to as a setup patch in this specification) for setting the standard copying conditions is used to set the standard exposure, i.e., the standard copying conditions for the exposure a color printer to form an object copied print. This is called setup.

The setup has a great influence upon the quality of a copied print, and a great deal of effort has been concentrated upon this point in color copying techniques. Unless the setup in done excellently, the exposure controlling conditions are not established. This causes the rate of obtaining high-quality copied prints and the productivity of copied prints to be decreased greatly, and the cost of production of copied prints to be increased greatly.

The setup is usually done in such a manner that an operator copies a setup patch repeatedly on trial while varying the exposure, to make a copied print approximating an object copied print and define the exposure, at which a copied print approximating an object copied print is made, as a standard exposure. However, in this method, much time and money are required to copy a setup patch on trial and an operator having the skill of judging copied prints visually.

There is a color printer provided with a computer and a means for measuring the density of an object copied print in advance with a reflection densitometer, storing the result of measurement in a memory, measuring the density of a copied print obtained by copying a setup patch on trial for determining a standard copying condition, manually inputting the density thus measured, computing the exposure, at which an object copied print can be obtained, by using a linear equation representing the difference between the manually inputted amount of measurement and the density measured as mentioned above of an object copied print, and setting the resulting exposure as a standard exposure. However, this printer requires an expensive reflection densitometer and also much time to carry out a inputting operation. Moreover, the linear equation is not established in many cases due to manufacturing or adjusting errors of the reflection densitometer and the irregularity of the photosensitive characteristics of different lots of photosensitive copying medium. Consequently, the above printer does not necessarily permit accurately setting a standard exposure.

An exposure control in a color printer usually depends upon the quality of the light from a copying light source. Therefore, when any change occurs between the quality of the light from a copying light source used for copying a setup patch and that of the light from a copying light source used for setting the standard copying conditions, the exposure cannot necessarily be controlled in a desired manner. However, when the constant exposure is not obtained suitably, the exposure controlling conditions referred to above are not established. Consequently, it becomes very difficult to obtain a high-quality copied print.

The exposure referred to above of each color means that an amount of transmitted light, which is obtained by integrating an amount of transmitted light with respect to an original color picture on the basis of the exposure time, contributes to the sensing of light in blue, green and red photosensitive layers of a photosensitive copying medium (mainly color paper). The above integrated amount is usually controlled so as to be maintained at a constant level on the basis of the relative relation between actual amounts of blue, green and red transmitted light concerned with the color printer and the amount of light referred to above. (The exposure to be referred to in the later paragraphs shall mean the integrated amount referred to above unless otherwise specified).

The constant amount referred to above of transmitted light of each color is determined in a condition-setting process. The conditions are generally set in a process for copying the standard original picture repeatedly on trial by using a standard original picture having an average transmission density, which is statistically and experientially determined, of an average original color picture while varying the exposure; and then defining as a standard exposure the exposure, which permits giving a predetermined object density to the copied prints thus obtained, and which is concerned with the color printer. This process is carried out in accordance with the sensitivity of a photosensitive copying medium, for each medium (mainly a color film) to be copied. The expense and time required for copying a standard original picture in this process vary in accordance with the skill of the operators. Even a skilled operator requires a considerable amount of expense and a considerably long time for carrying out the process. In addition, in order to make high-quality prints, it is necessary to set these conditions excellently.

It is also an essential condition for stably making high-quality copied prints that the exposure, which is defined in the conditions set as excellent copying conditions, and which corresponds to the standard exposure concerned with the color printer, be constantly maintained. Unless these conditions are satisfied, it is difficult to make high-quality copied prints.

However, it is a common phenomenon in a copying operation that the exposure corresponding to the standard exposure concerned with the color printer is not maintained at a constant level but varies unnecessarily. As mentioned previously, the exposure is controlled on the basis of the relative relation between amounts of transmitted light contributing to the sensing of the light in the photosensitive layers of various colors of a photosensitive copying medium and actual amounts of transmitted light of various colors concerned with the color printer. However, the amounts of transmitted light in a photosensitive copying medium and those of transmitted light concerned with the color printer do not generally agree with one another. This is ascribed to the difference between the spectral sensitivities of the blue, green and red photosensitive layers of a photosensitive copying medium and those of light detectors used in a color printer to determine the amounts of blue, green and red transmitted light. During a copying operation, the transmitted light in an original color picture usually varies due to the variations in the quality of the light from a copying light source, or variations in an average transmission density of the original color picture, or a combination of these variations. Due to the variations in the transmitted light in an original color picture in addition to the above-mentioned disagreement between the amounts of transmitted light in a photosensitive copying medium and those of transmitted light concerned with the color printer, the exposure cannot be controlled to an object level. Therefore, the exposure cannot be maintained at a constant level.

There is a known example, in which a filter adapted to absorb the light in low-sensitivity wavelength regions in each color sensitive layer of a photosensitive copying medium is inserted in the portion of a copying optical path which is between a copying light source and light detectors similar to the one referred to above, to properly establish the above-mentioned relative relation between amounts of transmitted light in a photosensitive copying medium and those of transmitted light concerned with the color printer. In this example, the difference between the spectral sensitivities of the photosensitive layers of a photosensitive copying medium and those of light detectors cannot be eliminated, so that an object effect cannot be obtained.

A conventional color printer also has a means for correcting actual amounts of blue, green and red transmitted light with the functions thereof. This correcting means is used mainly for approximately normalizing variations in an amount of transmitted light, which contributes to the sensing of the light in each color-sensitive layer of a photosensitive medium, on the basis of variations in an actual amount of the transmitted light due to variations in an average transmission density of an original color picture. This correcting means serves to obtain high-quality copied prints provided that the quality of the light from a copying light source does not vary. However, variations in an average transmission density of an original color picture and variations in the spectral intensity in the transmitted light, which are due to the variations in the quality of the light from a copying light source, are different. Accordingly, when the quality of the light from the copying light source varies, it is difficult to normalize as mentioned above by the above-mentioned correcting means the variations in an actual amount of the transmitted light, which occur due to variations in the transmitted light including the variations in the quality of the light from the copying light source. In addition, unnecessary variations occur in the exposure, so that high-quality copied prints cannot necessarily be made.

Variations in the quality of the light from a copying light source occur mainly in the following cases. A first case is a case, which accompanies with variations in the properties of a light source lamp used as a copying light source. It is difficult to maintain the quality of the light from a light source lamp at a constant level during a long-term use thereof. When a light source lamp is renewed due to the termination of the life thereof, the quality of the light from a new light source lamp is usually different from that of the old light source lamp. In the case where the light from a light source lamp is regulated by the lighting voltage therefor, the quality of the light also varies in the same manner as mentioned above. A second case is a case where the properties of the light from a light source vary while the light is regulated by color compensating filters. The exposure of, especially, blue, green and red is controlled with cut filters and a shutter. In a color printer, the light is regulated mostly for the purpose of setting substantially identical the time for operating cut filters and the time for operating a shutter, with respect to an average original color picture in accordance with the standard exposure, which is defined in the set conditions, and which is concerned with the color printer. The purpose of setting the operation time of cut filters and that of a shutter substantially identical with each other is to improve the production efficiency of copied prints, and obtain in some types of color printers the color correcting effect by incorrectly absorbing the colors, which are other than the main colors to be absorbed in the cut filters.

As described above, variations in the quality of the light from a copying light source occur not only when the light is regulated by an operator but also accidentally at any time. In order to eliminate in a conventional color printer the influence of unnecessary fluctuations of the exposure, which is caused by variations in the quality of the light from a copying light source, there is no better way than to set suitable conditions by using more money and sparing more time. Unless the influence referred to above is eliminated, high-quality copied prints cannot be constantly made.

SUMMARY OF THE INVENTION

The present invention has been developed in view of the above-mentioned problems. An object of the present invention is to provide a color printer capable of setting excellent standard copying conditions efficiently at any time without requiring skill, and obtaining high-quality copied prints stably. The above object can be achieved by a color printer including a means for measuring the densities of blue, green and red colors of an object copied print, which is prepared in advance with respect to an original color picture used to set the standard copying conditions, a means for memorizing the results of the measurement, and a means for setting the standard copying conditions on the basis of the functions of actual densities of blue, green and red colors of the copied print, which has been made by using the abovementioned original color picture, and the functions of the same colors of the object copied print, the color print being characterized in that the density of the copied print is measured in an optical path of copying exposure.

The photosensitive copying medium has a characteristic curve shown in FIG. 1, which represents the relation between a logarithm log E of the generally given exposure E and a reflection density D obtained by a relfection densitometer. The relation between log E and D in a linear portion of this characteristic curve can be defined by a linear equation. Accordingly, when the reflection densities of an object copied print and a copied print based on a setup patch, which is obtained by trial copying operations, are in the linear portion of the characteristic curve during an operation for setting the standard copying conditions, the exposure, at which the object copied print is to be made, can be determined by carrying out computation on the basis of the exposure used during the trial copying operations. In a normal operation for setting the standard copying conditions, the reflection densities of the mentioned two copied prints are shown in the linear portion referred to above. A color printer generally has light detectors for measuring amounts of blue, green and red transmitted light in an original color picture, and the exposure is controlled on the basis of outputs from the light detectors. It is also possible to measure the transmission density of a copied print with such light detectors. The relation between a reflection density D of a copied print and a transmission density DT referred to above have a relatively proportional relation shown in FIG. 2.

Therefore, the present invention permits measuring the transmission density of an object copied print with light detectors, memorizing the result of the measurement, measuring the transmission density of a copied print, which is obtained by trial copying operations during the setting of the standard copying conditions, and then computing the standard exposure, at which an object copied print is made, by a linear equation on the basis of the transmission density of the copied print obtained in the preceding step and the exposure, at which the preceding step is carried out. Accordingly, it is unnecessary to use much time and money to repeat trial copying operations. Thus, the present invention provides a rational means for setting the standard copying conditions, which does not require a reflection densitometer, and which permits saving the time for a manual inputting operation.

Another object of the present invention is to provide a color printer capable of suppressing the unnecessary fluctuations of exposure in spite of variations in the quality of the light from a copying light source, and making high-quality copied prints stably at any time irrespective of the quality of the light from a copying light source after the copying conditions are set excellently. The above object can be achieved by a color printer including a means for measuring amounts of blue, green and red light from a copying light source, and a means for measuring amounts of blue, green and red transmitted light in an original color picture to be copied, which is under the light source, characterized in that an output representative of amounts of the transmitted light in the original color picture is corrected on the basis of an output representative of an amount of the light from the light source, and the exposure of blue, green and red colors is controlled with the function of the corrected output representative of the transmitted light in the original color picture.

The above and other objects as well as advantageous features of the invention will become apparent from the following description of the preferred embodiment taken in conjunction with the accompanying drawings.

DESCRIPTION OF THE PREFERRED EMBODIMENTS

Figure 3:
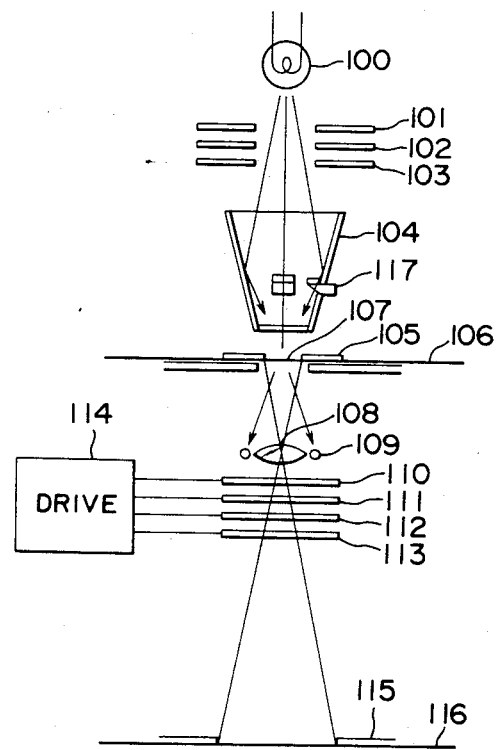
FIG. 3 schematically shows the construction of an embodiment of the present invention.

FIG. 3 schematically shows the construction of an embodiment of the present invention.

The light emitted from a light source lamp 100 passes through a light-regulating unit consisting of color compensating filters 101–103, to be mixed in and diffused from a mixing chamber 104. In a regular copying operation, an original color picture is fixedly placed in a setting section 107, and an image of the original color picture is projected on a color paper 116 through a lens 108. Amounts of transmitted light in the lens 108 are measured with light detectors 109, and a shutter 110 and cut filters 111–113 are actuated by a shutter and cut filter driving unit 114 on the basis of an output from the light detectors 109. According to the present invention, a copied print 106 is fixedly placed in the setting section 107 when the standard copying conditions are set, and amounts of transmitted light therein are measured with the light detectors 109, the result of the measurement being memorized therein. Reference numeral 105 denotes a mask for film.

Figure 4:
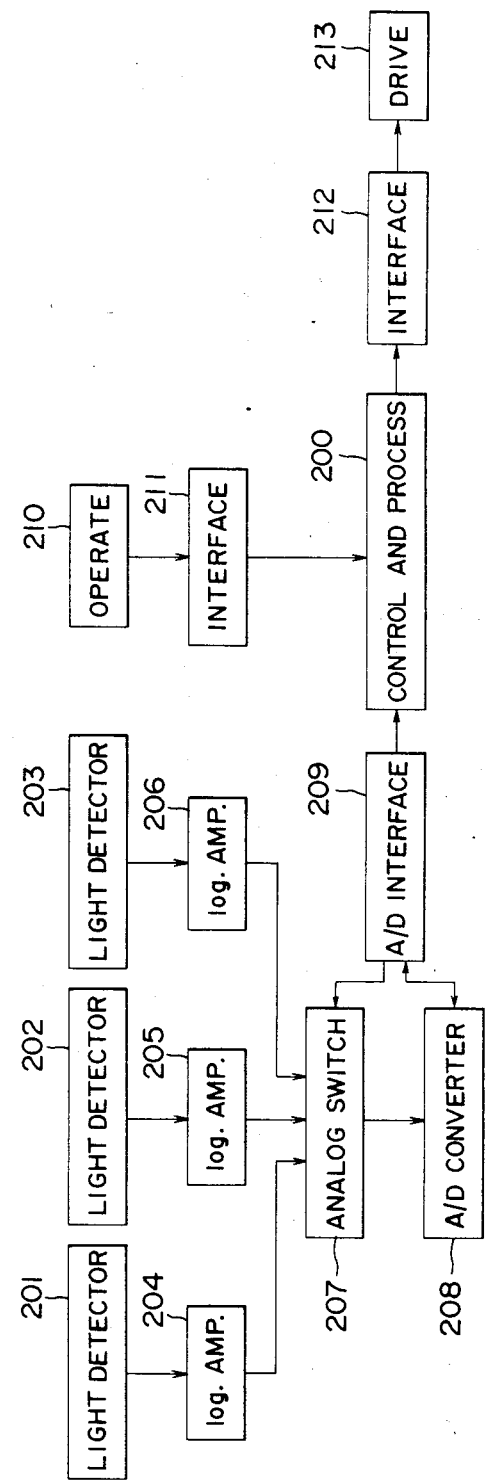
FIG. 4 is a block diagram of a control circuit in the color printer shown in FIG. 3.

FIG. 4 is a block diagram of a control circuit in the embodiment shown in FIG. 3, of a color printer according to the present invention.

A command signal for measuring the transmission density of the copied print, which is outputted from an operating element 210, is sent to a central controller and numerical processor 200 through an interface 211 of the operating element 210. After receiving this command signal, the central controller and numerical processor 200 outputs a sampling control signal to an analog signal switch 207 and an A/D converter 208 through an A/D interface 209. Measurement signals based on amounts of blue, green and red transmitted light in the copied print, which are measured in light detectors 201–203 (109 in FIG. 3), are subjected to the logarithmic conversion in logarithmic amplifiers 204–206. Output signals from the logarithmic amplifiers 204–206 are selected suitably by the analog signal switch 207 and converted into a digital signal in the A/D converter 208. The digital signal thus obtained is sent to the central controller and numerical processor 200 through the A/D interface 209. The transmission densities of both an object copied print, which is prepared in advance, and a copied print, which is obtained during trial copying operations, are measured in the same manner as mentioned above.

Figure 1:
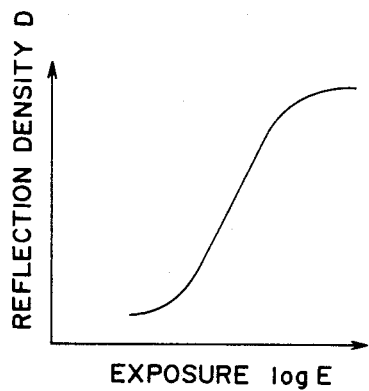
FIG. 1 is a characteristic curve showing the relation between the exposure and reflection density of a photosensitive copying medium.
Figure 2:
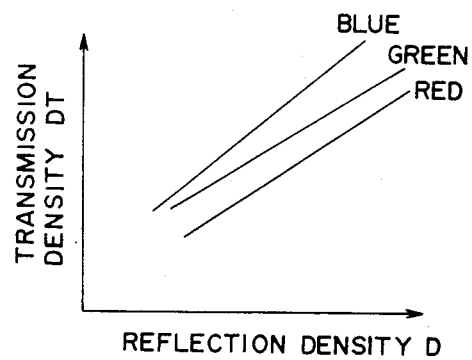
FIG. 2 is a diagram showing the relation between the reflection density and transmission density of a copied print.

In the central controller and numerical processor 200, a $3 \times 1$ matrix $[\Delta E]$ of a logarithmic correction amount for each color with respect to already-set logarithmic standard exposure is determined in accordance with the following equation on the basis of a $3 \times 1$ matrix [DTQ] representing actual transmission densities of the object copied print, which have as factors thereof the amounts corresponding to blue, green and red colors and obtained as mentioned above and a $3 \times 1$ matrix [DT] representing actual transmission densities of the copied print obtained during the trial copying operations.

$$[\Delta E] = [A^{-1}] \times ([DTQ] - [DT])$$

wherein A is a $3 \times 3$ matrix relating to the inclination of a linear portion of the characteristic curve in FIG. 1 and a proportion constant in the proportional relation shown in FIG. 2 and showing the relation between a logarithmic exposure difference and an actual density difference, which are determined and given in advance. The already-set logarithmic standard exposure is corrected with $[\Delta E]$ thus obtained to be set again.

When a regular copying operation is carried out by the color printer, in which the standard copying conditions have been set, amounts of transmitted light in an original color picture are measured with the light detectors 201–203 (109 in FIG. 3), and the measurement results are processed by the central controller and numerical processor 200 having a data memory. Driving control signals are sent to a shutter and cut filters driving unit 213 through an interface 212 thereof to control the exposure.

In the above embodiment, [A] is given in advance but the above equation is not established in some cases due to a manufacturing error in the color printer or the irregularity of photosensitive properties of different lots of photosensitive copying medium. Therefore, it is desirable that [A] be regulated suitably. The [A] can be regulated by applying a plurality of predetermined different exposure to the photosensitive copying medium, measuring the densities of a plurality of resulting copied prints, and defining the relation between a logarithmic exposure difference and an actual-density difference on the basis of the exposure referred to above and these actual densities of the copied prints.

In the embodiment described above, a position for setting the time for copying an original color picture is used also as a position for setting the time for measuring the density of a copied print, and the density of the copied print is measured with the transmitted light. These conditions may not necessarily be satisfied when the copying light source and light detectors have a certain positional relation. For example, the density of a copied print may be determined in terms of reflection density by using the printing light from the light source lamp 100. In addition, light detectors for use in measuring the density of a copied print may be additionally provided. These techniques are included in the scope of the present invention.

When amounts of blue, green and red light from a copying light source are measured to be memorized, differences between the quality of the light supplied from a copying light source during a copying operation and that of the light supplied from the same light source during an operation for setting the standard copying conditions can be measured. The control factors for managing an exposure control operation are corrected with the function of a value obtained in the above-mentioned measurement of difference. As a result, it becomes possible to control the exposure to a desired level. These techniques effectively serve to obtain high-quality copied prints stably irrespective of the quality of the light from the copying light source.

Figure 5:
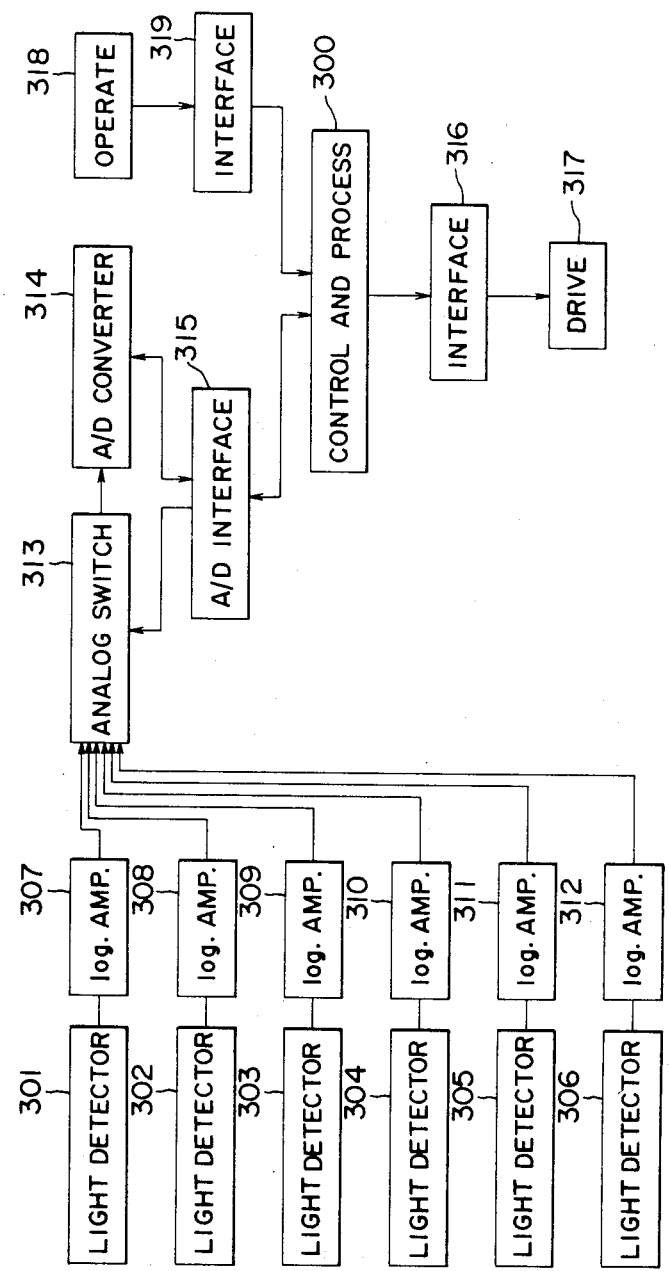
FIG. 5 is a block diagram of an exposure control circuit in the color printer.

FIG. 5 is a block diagram of an exposure control circuit in the color printer according to the present invention shown in FIG. 3.

During a copying operation, an operating input signal consisting mainly of an exposure correcting signal and an exposure command signal and applied to an operating element 318 are sent to a central controller and numerical processor 300 through an interface 319 of the operating element. After the central controller and numerical processor 300 receives an exposure command signal, it outputs a sampling control signal to an analog signal switch 313 and an A/D converter 314 through an A/D interface 315. Measurement signals based on amounts of blue, green and red light from a copying light source and amounts of transmitted light, which are determined by light detectors 301–303 (117 In FIG. 3) for use in measuring the amount of the light from a light source, and light detectors 304–306 (109 in FIG. 3) for use in measuring the amounts of the transmitted light, are subjected to logarithmic conversion in logarithmic amplifiers 307–312. This logarithmically converted signal S is expressed by the equation, $$S = -\log a \, i/io \tag{1}$$

wherein i is an output from a light detectors; io a standard output from a light detector; and a a constant of a logarithmic amplifier. Output signals from the logarithmic amplifiers are selected suitably with the sampling control signal by means of the analog signal switch 313. The selected signal is converted into a digital signal S' in the A/D converter 314 to be sent to the central controller and numerical processor 300 through the A/D interface 315.

The following process is carried out in the central controller and numerical processor 300 on the basis of the signal sent thereto.

First, a matrix [C] of an exposure correcting amount having blue, green and red colors as factors is defined on the basis of an exposure correcting signal. [C] is a matrix of $3 \times 1$, and the exposure correcting signal is usually not inputted. In this case, each of the factors C(i) of [C] can be expressed by the equation, $$C(i) = 0 \tag{2}$$

Let [L], [X] equal the matrixes of the signal S' obtained by the sampling as mentioned above and based on amounts of blue, green and red light from the copying light source and amounts of transmitted light in an original color picture to be copied, which is placed under the copying light source. Let [LO], [XO] equal the matrixes of the signal S' obtained during setting standard exposure condition, which are based on an amount of the light from the copying light source and an amount of the transmitted light in a standard original picture placed under the copying light source. Regarding the signal S', an output $[\Delta L]$ representative of variations in the quality of the light from the copying light source and an output [ΔX] representative of variations in the transmitted light in the original color picture can be expressed by the equations, $$[\Delta L] = [L] - [LO] \quad (3)$$

$$[\Delta X] = [X] - [XO] \quad (4)$$

In order to maintain the exposure in spite of variations in the transmitted light, which occur due to variations in the quality of the light from the copying light source and variations in an average transmission density in the original color picture, it is necessary that [ΔX] be corrected to an exposure factor consisting of logarithmic variations in the amount of the light, which contributes to the sensing of the light in the blue, green and red photosensitive layers of a photosensitive copying medium. An amount of logarithmic variations in an actual amount of the light sensed by a color printer can be normalized into the above-mentioned exposure factor in a practical range by a linear processing system. Since variations in the quality of the light from a copying light source and variations in the spectral intensity of the transmitted light, which are based on variations in an average transmission density in an original color picture, are different, it is reasonable that actual amounts of the light, which correspond to the respective variations mentioned above be normalized by different linear processing systems. An output [ΔD] representative of variations in an average transmission density in an original color picture can be expressed by the following equation on the basis of [ΔL] and [ΔX].

$$[\Delta D] = [\Delta X] - [K] \times [\Delta L] \quad (5)$$

wherein [K] is a 3×3 correction coefficient matrix of [ΔL] giving the same [ΔD] to the same original color picture irrespective of the level of [ΔL]. When [ΔD], [ΔD] are then normalized, the following equations are obtained.

$$[\Delta L'] = [NL] \times [\Delta L] \quad (6)$$

$$[\Delta D'] = [ND] \times [\Delta D] \quad (7)$$

wherein [NL] and [ND] are 3×3 matrixes for normalizing outputs based on variations in the quality of the light from a copying light source and variations in an average transmission density in an original color picture, respectively. [NL] and [ND] generally have the relation expressed by the following inequalities.

$$[NL] \neq [ND] \quad (8)$$

$$[NL] \neq [ND] \times [K] \quad (9)$$

[ND] is usually a diagonal matrix having a nondiagonal factor of 0.

Let [ΔX'] equal the above-mentioned exposure factor, and [ΔX'] can be determined by adding an output [ΔL'] representative of variations in the quality of a normalized copying light source to an output representative of an average transmission density of an original color picture, i.e. in accordance with the following equation.

$$[\Delta X'] = [\Delta L'] + [\Delta D'] \quad (10)$$

[ΔX'] can also be expressed by the following equation on the basis of other equation.

$$[\Delta X'] = [ND] \times [\Delta X] - ([ND] \times [K] - [NL]) \times [\Delta L] \quad (11)$$

In the central controller and numerical processor 200, outputs [ΔL], [ΔX] representative of the light from the copying light source and the transmitted light in the original color picture to be copied, respectively, are obtained in accordance with the equations 3 and 4, and the latter output [ΔX] is corrected on the basis of the former output [ΔL] in accordance with the equation 11 to obtain [ΔX'].

In the central controller and numerical processor 200, the operation time of cut filters and shutter is also determined to control the exposure in accordance with [C] and [ΔX'].

First, imagine ideal cut filters capable of absorbing the whole of the light of a photosensitive color in a main absorption color sensitive layer and transmitting the whole of the light of a photosensitive color in other color sensitive layer in blue, green and red photosensitive layers in a photosensitive copying medium. A maximum value of a factor T(i) of a matrix [T] of the operation time of the cut filters capable of absorbing blue, green and red light is used to express the operation time of a shutter. The following equation can then be established.

$$\log a\, T(i)/TO(i) = \Delta X'(i) + C(i) \quad (12)$$

wherein a is a constant of a logarithmic amplifier; TO(i) factors of a matrix [TO] of the operation time of the above-mentioned ideal cut filters, in which a maximum value of the factors is used to express the operation time of the shutter, these factors relating to a standard original picture obtained after the copying conditions are set; and ΔX'(i), C(i) the factors of [ΔX'], [C], respectively. The following equation can be obtained from the equation 12.

$$T(i) = TO(i) \times a^{\Delta X'(i) + C(i)} \quad (13)$$

[T] can be determined in accordance with the above equation.

The matrix [T] of the operation time of the above-mentioned ideal cut filters is then substituted for a matrix [T'] of the operation time of a cut filters in practical use. A maximum value of the factors of [T'] can be determined as the operation time of the shutter in accordance with the equation 14.

$$[T'] = [F] \times [T] \quad (14)$$

wherein F is a 3×3 matrix for correcting transmissivities of the cut filters, which can be determined on the basis of the relation between the spectral transmissivity of each cut filter and the spectral sensitivity of each of blue, green and red photosensitive layer, one of six kinds of matrixes being selected suitably in accordance with the order of operation of the cut filters.

Driving control signals for the shutter and cut filters are sent from the central controller and numerical processor 300 in order on the basis of the matrix [T'] of the operation time of the cut filters, a maximum value of which matrix is used as the operation time of the shutter, to a shutter and filter driving unit 317 (114 in FIG.

3) through a driving interface 316 to control the exposure.

The spectral sensitivities of a light detectors 117 used to measure an amount of the light from the copying light source and those of the light detectors 109 used to measure amounts of the transmitted light may not necessarily agree with each other. Variations in the quality of the light from the copying light source and variations in the spectral intensity in the transmitted light based on the variations in an average transmission density in an original color picture are different. Therefore, suitably regulating the spectral sensitivities of the above-mentioned light detectors with filters with respect to those of the blue, green and red photosensitive layers of the photosensitive copying medium is effective to improve the exposure controlling accuracy in the present invention.

In the above embodiment, [ΔX] is corrected on the basis of [ΔL]. The same effect can be obtained by correcting other factors, which form the controlling equation, such as [TO] and [C] instead of using the correcting method in the embodiment. In fact, the method of correcting [TO] and [C] has the same effect as the method of correcting [ΔX]. Consequently, the method of correcting [TO] and [C] is also within the scope of the present invention.

The above is a description of an embodiment, in which an amount of the light from a copying light source and an amount of the transmitted light in an original color picture are measured simultaneously. It is rarely the case that the quality of the light from a copying light source varies during a regular, continuous copying operation. Therefore, if an amount of the light from a copying light source is measured with a transmitted light-measuring means before a copying operation has been started, an object effect can be obtained.

When an input signal representative of the absence of a permeable shielding material, such as a color film in a copying optical path is generated, [L] or [LO] referred to above can be defined on the basis of [X] obtained at the time of generation of such an input signal.

The [L] or [LO] can also be defined on the basis of X obtained by inserting in a copying optical path a standard permeable shielding material to be used to measure an amount of the light from a copying light source, and then giving an order to measure the amount of the light from the light source. A standard original picture may be used as a standard permeable shielding material mentioned above.

The color printer according to the present invention described above permits setting the standard copying conditions excellently and efficiently at any time without requiring skill, and making high-quality copied prints stably at any time even when the quality of the light from a copying light source varies. The invention is very useful for color copying processes.

What is claimed is:

1. A color printer comprising: an exposure light, first light receiving and measuring means for measuring the densities of blue, green and red colors of a reference print image prepared previously corresponding to an original color picture used to set the standard copying conditions, means for memorizing the density information obtained by said measurement, second light receiving and measuring means for measuring the densities of blue, green and red colors of a newly formed copy print image by using said original color picture, and operation means for operating upon the density information from said reference print image and said copy print image to determine and automatically set at least the standard copying conditions for the printer corresponding to those conditions for a photosensitive copying medium, said first and second light receiving means comprising common light receiving detector means arranged in a first optical path of said exposure light, which first path is outside of a second optical path between said exposure light and said photosensitive copying medium, whereby said common light receiving detector means does not interface with printing.

2. A color printer according to claim 1, including means wherein the density information is converted into a digital signal and operated upon by said operation means.

* * * * *